United States Patent Office 3,629,333
Patented Dec. 21, 1971

3,629,333
POLYMETHYLENEBIS ADMANTANE AMINES
Donald Clarke Boughton, Kennett Square, Pa., and Walter E. Meier, Wilmington, Del., assignors to E. I. du Pont de Nemours and Company, Wilmington, Del.
No Drawing. Filed Aug. 28, 1969, Ser. No. 853,969
Int. Cl. C07c 87/40
U.S. Cl. 260—563 P                2 Claims

ABSTRACT OF THE DISCLOSURE

This application refers to polymethylene-bis(1-aminoadamantanes) and polymethylenebis(1-adamantanemethylamines) of the formula

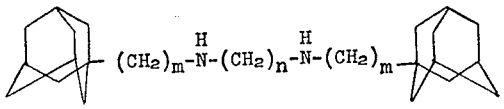

where $m$ is 0 or 1 and $n$ is 2 to 14 which are useful in pharmaceutical compositions thereof, and methods of pounds of the above formula where $n$ is 10 such as N,N'-decamethylenebis (adamantane-1-amine), or (adamantane-1-methylamine) are preferred.

BACKGROUND OF THE INVENTION

This invention relates to novel compounds, their salts, pharmaceutical compositions theerof, and methods of using pharmaceutically effective amounts of these preparations as anoretic agents.

Medical precedents have long established the use of drugs for weight control. The prior art reveals two broad classes of pharmaceutical agents especially effective for this purpose; they can loosely be described as metabolism accelerators and appetite depressants.

One of the earlier known of these agents, dinitrophenol, was first introduced commercially in 1933. This drug effected weight loss by acceleration of metabolism in the patent. Shortly after its introduction it was discovered to be quite toxic and its use as an anoretic agent was discontinued around 1935.

Another of these metabolism accelerators, thyroid U.S. PXU has long been employed to facilitate weight loss; however, medical authorities now agree that its use should be limited to those patients who have underactive thyroids.

Some of the belladonna preparations; morphine and other narcotic analgesics; and d-amphetamine and d-amphetamine type preparations, are representative of the classes of pharmaceutical agents which purportedly are effective appetite depressants.

Belladonna preparations are thought to inhibit appetite by causing loss of pleasure in eating; however, experiments on which these claims are based were poorly controlled and difficult to evaluate.

Morphine and other narcotic analgesics are said to cause loss of appetite, but are not acceptable for obvious reasons.

d-Amphetamine appears to be the best drug presently available for controlling appetite. d-Amphetamine-induced weight loss is due almost entirely to reduction in food intake and only in small measure to increased metabolism. The target tissue of this anoretic agent is believed to be the lateral hypothalmus of the brain. In addition to suppressing the hypothalmic centers which regulate the desire for food, d-amphetamine causes a loss of actuity of the senses of smell and taste thereby making food less appealing.

Unfortunately, continued use of d-amphetamine often causes nervousness and irritability as side effects; also, administration in late afternoon generally interferes with sleep. This last side effect most severely limits its usefulness, since most patients tend to overeat in the evening. Attempts have been made to combine d-amphetamine with sedatives; however, the problem remains unsolved.

Prolonged use of d-amphetamine is not usually possible since tolerance to the appetite depressant develops quite rapidly, and increasing the dosage ordinarily significantly exaggerates the aforementioned side effects.

Most authoritative evaluations of the other d-amphetamine type compounds do not reveal any agent superior to d-amphetamine in either effectiveness as an appetite depressant or in the level of undesirable side effects.

The factors of recognized medical need plus shortcomings in presently available pharmaceutical agents leads us to believe in the significance of our invention.

SUMMARY OF THE INVENTION

This invention relates to novel polymethylene-bis(1-aminoadamantanes) and polymethylenebis(1-admantane methylamines) which can be represented by the formula:

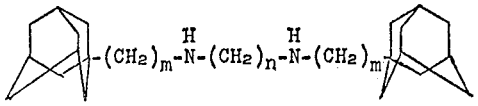

where:

$m$ is 0 or 1
$n$ is from 2 to 14;

pharmaceutical compositions where the active ingredient is the above compound or its salt; and methods of using pharmaceutically effective amounts of these compounds or salts, alone or in combination with non-toxic pharmaceutical carriers, as anoretic agents in mammals.

One of the more significant aspects of this invention is the demonstration of significant appetite depressant activity with a more favorable therapeutic index than that of presently available anoretic agents.

Preferred pharmaceutical formulations of this invention have as their active ingredient a compound which can be respresented by the formula:

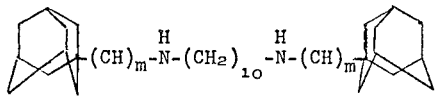

It also will be understood that the compounds disclosed in this application have basic amino groups, which readily form salts and such salts having non-toxic anions are also included within the scope of the present invention. Representative of such salts are hydrochlorides, hydrobromides, sulfates, phosphates, acetates, succinates, adipates, propionates, tartrates, citrates, bicarbonates, pamoates, cyclohexylsulfamates and acetylsalicylates. Of these the hydrochlorides, acetates and cyclohexylsulfamates are preferred. The cyclohexylsulfamates have a pleasant taste and thus are particularly useful in preparing syrups for oral administration. Additionally the cyclohexylsulfamates have usefulness in making uncoated tablets for oral administration which have no objectionable bitter taste. In general, the salts described above enhance the usefulness of the relatively insoluble amines in pharmaceutical applications.

DESCRIPTION OF THE INVENTION

This invention relates to novel polymethylenebis-(adamantan-1-amines) and polymethylenebis-(adamantane-1-methyl-amines) which can be represented by the formula:

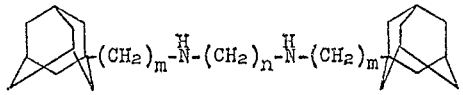

where:

$m$ is 0 or 1
$n$ is from 2 to 14;

and pharmaceutically acceptable salts thereof; and methods of using pharmaceutically acceptable amounts of this compound or salts, alone or in combination with nontoxic pharmaceutical carriers, as anoretic agents in mammals.

Compounds of this invention can be prepared by a method disclosed in J. Med. Chem. 11: 1103, 1968, or as described in the following examples:

EXAMPLE 1

N,N'-tetramethylenebis(adamantan-1-amine) dihydrochloride, M.P. 381–383° C., can be prepared by adding dropwise 7.2 parts of succinyl chloride in 50 parts of diethyl ether to a mixture 15 parts of 1-aminoadamantane and 10.2 parts of triethylamine in 500 parts of ether. The mixture is refluxed for 1 hour and the resultant solid is collected by filtration. The solid is triturated with 500 parts of water, filtered and air dried. The dried solid is recrystallized from dimethylformamide to yield 10.3 parts of N,N'-di-1-adamantylsuccinamide, M.P. 272–274° C.

The diborane generated in a separate flask by slowly adding 5.1 parts of sodium borohydride in 125 parts of diglyme to 28.5 parts of freshly distilled boron trifluoride in 50 parts of diglyme over a one half hour period is swept by a slow stream of nitrogen into a flask containing 6 parts of N,N'-di-1-adamantylsuccinamide and 200 parts of refluxing tetrahydrofuran. The tetrahydrofuran is refluxed for an additional four hours after generation of the diborane is complete. 150 parts of methanol are added to the tetrahydrofuran followed by saturation with anhydrous hydrogen chloride. The solvent is removed by heating under vacuum. The resultant solid is recrystallized from ethanol to yield 1.7 parts of N,N'-tetramethylenebis(adamantan-1-amine) dihydrochloride, M.P. 381–383° C.

EXAMPLE 2

N,N'-hexamethylenebis(adamantan-1-amine) dihydrochloride, M.P. 331–333° C., can be prepared by substituting 9.1 parts of adipoly chloride for the succinyl chloride of Example 1. The product is recrystallized from dimethylformamide to yield 20 parts of N,N'-di-1-adamantyladipamide, M.P. 262–265° C. 7 parts of N,N'-di-1-adamantyladipamide are substituted for N,N'-di-1-adamantylsuccinamide of Example 1 to yield 2.4 parts of N,N'-hexamethylenebis(adamantan-1-amine) dihydrochloride, M.P. 331–333° C.

EXAMPLE 3

N,N'-heptamethylenebis(adamantan-1-amine) dihydrochloride, M.P. 322–323° C., can be prepared by substituting 9.8 parts of pimeloyl chloride for succinyl chloride of Example 1 to yield 17 parts of N,N'-diamantylpimelamide, M.P. 208–209° C. Diborane reduction of 7.5 parts of the amide yields 3.6 parts of N,N'-heptamethylenebis-(adamantan-1-amine) dihydrochloride, M.P. 322–323° C.

EXAMPLE 4

N,N'-decamethylenebis(adamantan-1-amine) dihydrochloride, M.P. 363–364° C., can be prepared by substituting 10.2 parts of sebacyl chloride for the succinyl chloride of Example 1 to yield 22 parts of N,N'-di-1-adamantylsebacamide, M.P. 216–217° C. Diborane reduction of an 8.0 parts sample of N,N'-di-1-adamantylsebacamide yields 5.4 parts of N,N'-decamethylenebis(adamantan-1-amine) dihydrochloride, M.P. 363–364° C.

The following acid chlorides can be substituted for the acid chloride of Example 1 to yield the corresponding diamine salts:

| Ex. | Acid chloride | Diamine |
|---|---|---|
| 5 | Oxayl chloride | N,N'-ethylenebis(adamantan-1-amine)dihydrochloride, M.P. 342–343 C. |
| 6 | Nonanedioyl chloride | N,N'-nonamethylenebis(adamantan-1-amine) dihydrochloride, M.P. 314–316 C. |
| 7 | Tridecanedioyl chloride | N,N'-tridecamethylenebis(adamantan-1-amine) dihydrochlride, dec. 341 C. |
| 8 | Dodecandioyl chloride | N,N'-dodecamethylenebis(adamantan-1-amine) dihydrochloride, dec. 343–346 C. |
| 9 | Tetradecanedioyl chloride | N,N'-tetradecamethylenebis(adamantan-1-amine) dihydrochloride, M.P. 316–318 C. |

EXAMPLE 10

N,N'-decamethylenebis(adamantane - 1 - methylamine) dihydrochloride, M.P. 350–351° C., can be prepared by adding a solution of 9 parts of 1-adamantyl chloride in 100 parts benzene to a solution consisting of 50 parts pyridine, 8 parts 1,10-diaminodecane and 150 parts benzene. The temperature of the reaction is held below 30° C. during the addition and then the temperature is subsequently raised to 50° C. for 1 hour after the addition is complete. The reaction is poured into 500 parts of water. The water layer is separated and extracted with 100 parts of benzene, then discarded. The benzene portions are combined and washed with 0.5 N-hydrochloric acid until the wash remains acidic. The benzene solution is next washed with 1% sodium bicarbonate solution and then dried over anhydrous magnesium sulfate. The solvent is removed under vacuum to yield 5.4 parts of solid amide which is then dried. A mixture of 5.4 parts of amide, 5 parts of lithium aluminum hydride and 150 parts of tetrahydrofuran is refluxed for 16 hours. The excess hydride is decomposed by careful addition of saturated sodium sulfate solution. The solid is removed by filtration. Anhydrous hydrogen chloride is passed into the solution until precipitation is complete. The solid is extracted in a Soxhlet apparatus with water. The solid precipitating from the water in the flask is collected to yield 3.1 parts of N,N'-decamethylenebis(adamantane - 1 - methylamine) dihydrochloride, M.P. 350–351° C.

The following diamines can be substituted for 1,10-diaminodecane of Example 10 to yield the corresponding products:

| Ex. | Diamine | Product |
|---|---|---|
| 11 | Ethylenediamine | N,N'-ethylenebis(adamantane-1-methylamine) dihydrochloride. |
| 12 | 1,3-diaminepropane | N,N'-trimethylenebis(adamantane-1-methylamine) dihydrochloride. |
| 13 | 1,4-diaminobutane | N,N'-tetramethylenebis(adamantane-1-methylamine) dihydrochloride. |
| 14 | 1,5-diaminopentane | N,N'-pentanethylenebis(adamantane-1-methylamine) dihydrochloride. |
| 15 | 1,6-diaminohexane | N,N'-hexamethylenebis(adamantane-1-methylamine) dihydrochloride. |
| 16 | 1,7-diaminoheptane | N,N'-heptamethylenebis(adamantane-1-methylamine) dihydrochloride. |
| 17 | 1,8-diaminooctane | N,N'-octamethylenebis(adamantane-1-methylamine) dihydrochloride. |
| 18 | 1,9-diaminononane | N,N'-nonamethylenebis(adamantane-1-methylamine) dihydrochloride. |
| 19 | 1,11-diaminoundecane | N,N'-undecamethylenebis(adamantane-1-methylamine) dihydrochloride. |
| 20 | 1,12-diaminododecane | N,N'-dodecamethylenebis(adamantane-1-methylamine) dihydrochloride. |
| 21 | 1,13-diaminotridecane | N,N'-tridecamethylenebis(adamantane-1-methylamine) dihydrochloride. |
| 22 | 1,14-diaminotetradecane | N,N'-tetradecamethylenebis(adamantane-1-methylamine) dihydrochloride. |

EXAMPLE 23

A mixture of 0.10 mole of N,N'-decamethylenebis(adamantan-1-amine), or (adamantane - 1 - methylamine), and 0.20 mole of 48% hydrobromic acid is concentrated and dried under vacuum at 60° C. to yield N,N'-bis(adamantan-1-amine), or (adamantane - 1 - methylamine), dihydrobromide.

The procedure of Example 23 is repeated, substituting an equivalent amount of the indicated reactants for those of Example 23, in order to obtain the indicated acid-addition salts.

The dosage administered will be dependent upon the age, health, and weight of the recipient, the kind of concurrent treatment, if any, frequency of treatment and intensity of the anoretic effect desired. Generally, a daily dosage of active ingredient compound will be from about 0.01 to 50 mg./kg. per dose, the precise amount being ascertainable with certainty by one skilled in the art. The preferred dosage of the active compound or pharmaceutical composition is from 1.0 to 15 mg./kg. per dose of active ingredient.

The activity of these compounds as anoretic agents

| Ex. | Amine | Acid | Salt |
|---|---|---|---|
| 24 | N,N'-decamethylene-bis(adamantan-1-amine) | 95% phosphoric acid | N,N'-decamethylenebis(adamantan-1-amine)bis(dihydrogen phosphate). |
| 25 | | Sulfuric acid | N,N'-dicamethylenebis(adamantan-1-amine)di(hydrogen sulfate). |
| 26 | | Tartaric acid | N,N'-decamethylenebis(adamantan-1-amine)di(hydrogen tartrate). |
| 27 | | Perchloric acid | N,N'-decamethylenebis(adamantan-1-amine)di(perchlorate). |
| 28 | | Maleic acid | N,N'-decamethylenebis(adamantan-1-amine)di(hydrogen maleate). |
| 29 | | Acetic acid | N,N'-decamethylenebis(adamantan-1-amine)diacetate. |
| 30 | | Citric acid | N,N'-decamethylenebis(adamantan-1-amine)bis(dihydrogen citrate). |
| 31 | | Succinic acid | N,N'-decamethylenebis(adamantan-1-amine)disuccinate. |
| 32 | | Mandelic acid | N,N'-decamethylenebis(adamantan-1-amine)dimandelate. |
| 33 | | Lactic acid | N,N'-decamethylenebis(adamantan-1-amine)dilactate. |

As previously stated, this invention relates to the use of a pharmaceutically effective amount of an anoretic agent of this invention to curb the natural appetite of mammals.

It will be understood that a "pharmaceutically effective amount" of an anoretic agent is intended to describe a dosage of from 0.01 to 50 mg./kg. per dose, the precise amount being ascertainable with certainty by one skilled in the art.

It will be understood that an "anoretic agent" is a compound or active ingredient in a pharmaceutical composition which curbs the natural appetite of a mammal for nourishment. The scope of the term "curb" is to be viewed as pervasive of the entire spectrum of appetite depression, from any restraint upon the natural food intake of the mammal to total suppression of food intake.

It will be understood that "mammal" includes any of a class of higher vertebrates that nourish their young with milk secreted by mammary glands and have skin usually more or less covered with hair.

The compounds or pharmaceutical compositions of this invention can be administered in the anoretic treatment of this invention by any practical means that delivers a pharmaceutically effective amount of the active compound of this invention to those areas of the central nervous system and/or other areas within the body which are believed to control the mammal's intake of food. Although parenteral administration of the compound or pharmaceutical composition may be desirable in some situations, ingestion of the active compound, either in a pharmaceutical composition alone or in some dietetic food or beverage appears to be the more preferred method of administration.

is indicated by testing in mice according to the method of Clark in Toxicol. Appl. Pharmacol. 15, 212–215 (1969) and in dogs according to the method of Stegen, Zsoter and Chappel in Toxicol. App. Pharmacol. 2, 589–601 (1960).

The predictive validity of the test in mice was determined by comparing the effects of two known anti-appetite drugs, d-amphetamine and phenmetrazine, with those of four drugs, chloropromazine, chlordiazepoxide, pentobarbitol and tetrabenazine, known to cause central nervous system depression. Data from the above screen suggests that this test is effective in discriminating anoretic agents and those that manifest CNS stimulation or depression.

The following is a description of the procedure used in evaluating the compounds of this invention:

METHOD

Female mice, of roughly equivalent weight, are divided into groups of 25 each and housed in a holding room in gray opaque plastic holding cages for 13 days prior to test. The animals are given continual access to food and water during this period. Room (holding and experimental) temperature is maintained at 76° F. ±2° F. The room lights are on from 6 A.M. to 8 P.M. each day.

On the day of the appetite test the mice are deprived of food for 24 hours. The animals are moved into an experimental room, divided into groups of 5 each and put into white translucent plastic boxes. The mice are not given any food or water when they are in these boxes. After a 60-minute period the mice are removed from the boxes, weighed and then orally dosed with either compound or control vehicle on a blind basis. After dosing the animals are returned to the boxes for an additional 60-minute period without food or water. At the end of this period each mouse is observed for signs of abnormal locomotor activity. Since the control animals are invariably asleep at this time, the observer can readily detect an increase in spontaneous motor activity, which is indicative of compound-induced stimulation. When these observations are completed, each mouse is transferred to an individual clear-plastic feeding chamber. Each feeding chamber contains 2 brass bars into each of which 10 holes have been milled (hole diameter=5/16"; distance between centers of 2 adjacent holes=3/16"; hole depth=0.180"). Each hole is about half-filled with 0.05 ml., (±5%) of a 50% aqueous solution of sweetened condensed milk. The bars are loaded by means of an automatic pipette connected to a 10-tube manifold that divides the total volume of milk into 10 equal parts. After 5 minutes in the feeding chamber the mice are again observed for signs of abnormal activity. Since the control animals are invariably active at this time one can readily detect a decrease in spontaneous motor activity, which is indicative of compound-induced depression. The mice remain in the feeding chamber for 45 minutes at which time a count is made of the number of milk drops consumed, estimated to the nearest 0.025 ml.

All compounds are prepared in a PVA-acacia vehicle (polyvinyl alcohol 1%, acacia 5% and methylparaben 0.1% in water) and administered orally at a constant volume of 0.01 ml./g. of body weight. Groups of 10 to 100 mice are treated at the dosage levels indicated in the table. Doses are expressed as milligram (mg.) of base compound weight per kilogram (kg.) of animal body weight. Eighty mice serve as control animals and receive the PVA-acacia vehicle alone.

RESULTS

The accompanying table shows (1) the effect of each dose of each compound on milk consumption in mice expressed as a percentage of the milk intake of the control animals (Control Mean=0.45 ml./mouse), (2) the dosage value which is estimated to cause a 50% reduction in milk consumption, Anti-Appetite ED50), (3) the dosage estimated to cause signs of stimulation in 50% of the mice (Stimulant ED50) or depression in 50% of the mice (Depressant ED50) and (4) the ratio of the Stimulant or the Depressant ED50 to the Anti-Appetite ED50. This ratio value is thought to predict the relative separation between doses that will cause loss of appetite and doses that will cause CNS stimulant or depressant side effects in test subjects. All ED50 values are determined according to the method of Litchfield and Wilcoxon (Litchfield, J. T., Jr. and Wilcoxon, F.: A Simplified Method of Evaluating Dose-Effect Experiments. J. Pharm. Exptl. Therap., 1949, 96, 99–113).

| Compound | No. of mice | Oral dose or ED50 (mg./kg.)[1] | Anti-Appetite (Percent of control) | Percent stimulated | Percent depressed | Ratio [2] |
|---|---|---|---|---|---|---|
| PVA-Vehicle (Control) | 80 | [3] 0.01 | [4] 100 | 16 | 0 | |
| N,N'-tetradecanmethylene bis(adamantan-1-amine) dihydrochloride | 10 | 12.5 | 65 | 10 | 0 | |
| | 10 | 25.0 | 48 | 10 | 0 | >4.8 |
| | 10 | 50.0 | 21 | 0 | 20 | |
| | 10 | 100.0 | 11 | 0 | 30 | |
| | | ED50 21.0 | | >100 | >100 | |
| N,N'-decamethylenebis(adamantan-1-amine) dihydrochloride | 40 | 1.0 | 87 | 21 | 0 | |
| | 40 | 4.0 | 91 | 19 | 0 | |
| | 20 | 12.5 | 68 | 10 | 0 | |
| | 40 | 16.0 | 39 | 16 | 5 | |
| | 20 | 25.0 | 36 | 10 | 5 | 6.4, 7.2 |
| | 20 | 50.0 | 26 | 5 | 25 | |
| | 40 | 64.0 | 19 | 30 | 50 | |
| | 20 | 100.0 | 9 | 0 | 60 | |
| | 10 | 256.0 | 13 | 70 | 30 | |
| | | ED50 26.5 | | 170.0 | 190.0 | |
| N,N'-hexamethylenebis(adamantan-1-amine) dihydrochloride | 30 | 1.0 | 94 | 26 | 0 | |
| | 30 | 4.0 | 109 | 20 | 0 | |
| | 10 | 12.5 | 69 | 0 | 30 | |
| | 30 | 16.0 | 52 | 36 | 0 | |
| | 10 | 25.0 | 40 | 0 | 0 | 4.4 |
| | 10 | 50.0 | 22 | 30 | 30 | |
| | 30 | 64.0 | 23 | 46 | 0 | |
| | 10 | 100.0 | 10 | 0 | 90 | |
| | 10 | 256.0 | 0 | 0 | 100 | |
| | | ED50 21.0 | | >256 | 93.0 | |
| N,N'-tetramethylene bis(adamantan-1-amine) dihydrochloride | 30 | 1.0 | 85 | 16 | 0 | |
| | 30 | 4.0 | 102 | 13 | 0 | |
| | 30 | 16.0 | 49 | 23 | 0 | 6.1 |
| | 30 | 64.0 | 28 | 43 | 6 | |
| | 10 | 256.0 | 0 | 0 | 100 | |
| | | ED50 19.0 | | >256 | 116.0 | |
| N,N'-decamethylene bis(adamantanemethyl-1-amine) dihydrochloride | 10 | 12.5 | 72 | 0 | 0 | |
| | 10 | 25 | 25 | 0 | 0 | 5.4 |
| | 10 | 50 | 18 | 0 | 30 | |
| | 10 | 100 | 10 | 0 | 50 | |
| | | ED50 18.5 | | 0 | 100.0 | |
| d-Amphetamine | 100 | 0.25 | 82 | 20 | 0 | |
| | 100 | 0.50 | 68 | 28 | 0 | 1.7 |
| | 100 | 1.00 | 61 | 42 | 0 | |
| | 100 | 2.00 | 15 | 69 | 0 | |
| | | ED50 0.9 | | 1.5 | | |

[1] Mg. of base compound weight/kg. mouse body weight.
[2] Ratio of Stimulant ED50 or Depressant ED50 to Anti-Appetite ED50.
[3] Milliliters/gram.
[4] 0.45 milliliter.

The compounds of this invention show promise for use as anoretic agents due to the demonstration of significant appetite depressant capacity in addition to a more favorable therapeutic index than that of the presently available weight reduction preparations.

The active ingredient for this invention can be employed in useful compositions according to the present invention in such dosage forms as tablets, capsules, powder packets, or liquid solutions, suspensions, or elixirs, for oral administration. In such compositions the active ingredient will ordinarily always be present in an amount of at least 0.2% by weight based on the total weight of the composition and not more than 99% by weight.

Besides the active ingredient of this invention the composition will contain a solid or liquid non-toxc pharmaceutical carrier for the active ingredient.

In one embodiment of a pharmaceutical composition of this invention, the solid carrier is a capsule which can be of the ordinary gelatin type. In the capsule will be from about 1–99% by weight of a polymethylenebis(adamantan-1-amine) or polymethylenebis(adamantane-1-methylamine) and 99–1% of a carrier. In another embodiment, the active ingredient is tableted with or without adjuvants. In yet another embodiment, the active ingredient is put into powder packets and employed. These capsules, tablets, and powders will generally constitute from about 1% to about 99% and preferably from 10% to 90% by weight of active ingredient. These dosage forms generally contain from about 1 to about 500 milligrams of active ingredient, with from about 10 milligrams to about 250 milligrams preferred.

As mentioned above, oral administration can be in a suitable suspension or syrup, in which the active ingredient generally will constitute from about .02 to 10%, and preferably about 0.2 to 5% by weight. The pharmaceutical carrier in such composition can be a watery vehicle such as an aromatic water, a syrup or a pharmceutical mucilage.

Suitable pharmaceutical carriers are described in "Remington's Pharmaceutical Sciences" by E. W. Martin, a well-known reference text in this field.

In addition to the exemplary illustrations above, the following examples further explain one aspect of the present invention:

EXAMPLE 34

A large number of unit capsules are prepared for oral administration by filling standard two-piece hard gelatin capsules each with 50 milligrams of a powdered polymethylenebis(adamantan - 1 - amine or adamantane-1-methylamine), 175 milligrams of lactose, 5 milligrams of magnesium stearate, and 20 milligrams of talc.

EXAMPLE 35

A large number of unit capsules are prepared for oral administration by filling soft gelatin capsules with a solution of a polymethylenebis(adamantan-1-amine or adamantane-1-methylamine) in soybean oil.

EXAMPLE 36

A large number of tablets are prepared by conventional procedures so that the dosage unit is 25 milligrams of active ingredient, 4 milligrams of gelatin, 4 milligrams of magnesium stearate, 5 milligrams of starch, 5 milligrams of microcrystalline cellulose and 100 milligrams of mannitol. Slow release tablets can also be used, by applying appropriate coatings.

A large variety of compositions according to this invention can thus readily be made by substituting other compounds for this invention, and including specifically but not limited to compounds for this invention that have specifically been named hereinbefore. The compounds will be used in the amounts indicated in accordance with procedures well known and described in the Martin text mentioned above.

It is claimed:

1. A compound of the formula:

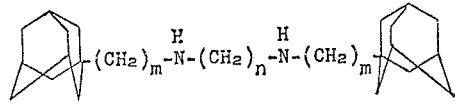

where $m$ is 0 or 1

$n$ is from 2 to 14;

or pharmaceutically acceptable acid-addition salts of said compounds.

2. The compounds of claim 1, wherein the compounds are of the formula:

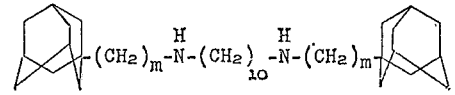

References Cited

UNITED STATES PATENTS 3,523,137   8/1970   Moore _____ 260—558

ALEX MAZEL, Primary Examiner

D. R. PHILLIPS, Assistant Examiner

U.S. Cl. X.R.

260—501.2, 557 R; 424—316, 325